(12) United States Patent
Hoshi et al.

(10) Patent No.: US 8,159,913 B2
(45) Date of Patent: Apr. 17, 2012

(54) OPTICAL DISC RECORDING APPARATUS AND RECORDING POWER CONTROL METHOD

(75) Inventors: Tomoya Hoshi, Fujisawa (JP); Atsushi Yamada, Saitama (JP); Tooru Kawashima, Funabashi (JP); Mitsuhiro Nishidate, Sagamihara (JP); Tsuyoshi Toda, Kodaira (JP); Koichiro Nishimura, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1583 days.

(21) Appl. No.: 11/581,758

(22) Filed: Oct. 17, 2006

(65) Prior Publication Data
US 2008/0089204 A1 Apr. 17, 2008

(51) Int. Cl.
*G11B 7/00* (2006.01)
(52) U.S. Cl. ............... 369/47.53; 369/47.44; 369/59.12
(58) Field of Classification Search ............ 369/47.39, 369/47.51, 47.53, 53.26, 59.11, 59.13, 59.12
See application file for complete search history.

(56) References Cited

U.S. PATENT DOCUMENTS

| | | | | |
|---|---|---|---|---|
| 5,949,747 A * | 9/1999 | Miyashita et al. | ......... | 369/53.26 |
| 6,031,803 A * | 2/2000 | Kubota et al. | ............ | 369/53.26 |
| 6,529,457 B1 * | 3/2003 | Narumi et al. | ............ | 369/47.53 |
| 6,600,715 B2 * | 7/2003 | Okumura et al. | ......... | 369/275.1 |
| 6,731,584 B1 * | 5/2004 | Nagara | .......................... | 369/116 |
| 7,190,647 B2 * | 3/2007 | Kitagaki et al. | .......... | 369/47.51 |
| 2003/0053386 A1 * | 3/2003 | Takeda | ....................... | 369/47.53 |
| 2003/0185118 A1 * | 10/2003 | Takeda | ....................... | 369/47.39 |
| 2004/0252617 A1 * | 12/2004 | Kitagaki et al. | ........... | 369/59.11 |
| 2005/0157620 A1 * | 7/2005 | Narumi et al. | ............ | 369/47.53 |
| 2006/0187788 A1 * | 8/2006 | Kakimoto et al. | ......... | 369/59.11 |
| 2007/0030785 A1 * | 2/2007 | Masui et al. | ............... | 369/59.13 |
| 2007/0127336 A1 * | 6/2007 | Kobayashi et al. | ........ | 369/47.53 |
| 2007/0140085 A1 * | 6/2007 | Koishi | ....................... | 369/59.11 |

FOREIGN PATENT DOCUMENTS

| | | |
|---|---|---|
| JP | 10-134389 | 5/1998 |
| JP | 10-320777 A | 12/1998 |
| JP | 2004-273074 | 9/2004 |

OTHER PUBLICATIONS

Japanese Office Action issued in Japanese Patent Application No. JP 2005-169372 dated on Feb. 17, 2009.

* cited by examiner

*Primary Examiner* — Thuy Pardo
(74) *Attorney, Agent, or Firm* — McDermott Will & Emery LLP

(57) ABSTRACT

It is to provide an optical disc recording apparatus and a recording power control method that are adapted to high-speed recording and can set an optimal erasing power with high accuracy. A test writing signal detector reproduces a test writing signal of a predetermined mark length or space length with varied power, and detects the number of error mark signals and an amplitude value of an envelope. A controller obtains a first threshold Pe0 of the erasing power based on the number of error mark signals in a region where laser power is low, and obtains a second threshold Pe1 of the erasing power based on the amplitude value in a region where the laser power is high. Then, the controller sets an optimal value of the erasing power from an average value of the first and second thresholds.

4 Claims, 5 Drawing Sheets

OPTICAL DISC RECORDING APPARATUS AND RECORDING POWER CONTROL METHOD

BACKGROUND OF THE INVENTION (1) Technical Field of the Invention

The present invention relates to an optical disc recording apparatus and recording power control method that prevent an increase of jitter and realize stability in high-speed recording when data is recorded on an optical disc.

(2) Description of the Related Art

A phase change optical disc performs recording using reversible phase change between amorphous and crystal. A high output laser beam is irradiated onto a phase change film which is heated to a temperature equal to or higher than the melting point and is then quenched, and thus an amorphous mark is formed. A laser beam at a temperature between the crystallizing temperature and the melting point is irradiated onto the formed mark which is crystallized and thus erased. In the case of overwriting, the mark is once erased before data recording.

Recently, the recording speed of a phase change optical disc such as a DVD-RAM has been increased. Along with the increase in recording speed, the time period for the crystallization to erase the mark decreases in overwriting, and jitter is likely to occur due to an incomplete erasure after overwriting, because of an increase of the difference of the recording linear velocity between the inner and outer circumferences of the disc in CAV recording or other reasons. Thus, it is necessary to more accurately set an erasing power to erase the mark.

To meet the above described requirement there have been proposed various methods of optimizing the recording power and erasing power in test writing. For example, described in Japanese Patent Application Laid-Open No. Hei 10(1998)-320777 is a technology for setting a threshold of the recording power relative to a recording medium in such a way that a mark is recorded on the recording medium by varying the recording power of the light to be irradiated onto the recording medium and detects the phase lag (corresponding to the jitter amount) between a clock signal and a signal indicating an end of the mark obtained by reproducing the recorded mark. Here, FIG. 1 of Japanese Patent Application Laid-Open No. Hei 10(1998)-320777 shows the jitter amount or information corresponding thereto (error count number).

SUMMARY OF THE INVENTION

There has been however a difficulty to set an optimal power value with a high accuracy, when using the jitter amount (or the information corresponding thereto) serving as a reference of evaluating the optimization of the recording power and erasing power as the conventional technology described above.

In other words, when the jitter amount is tried to be measured in real time through RAW (Read After Write) after high-speed recoding, it is difficult to obtain information with a high accuracy unless the reproduction speed is reduced, because the response speed is limited in the detection circuit and LSI. There is another method of obtaining the jitter information indirectly from RF signal amplitude information. However, the jitter amount is scattered under the influence of the amplitude change of the RF signal itself, resulting in degradation of the setting of the optimal power value.

The present invention addresses the above described needs by providing an optical disc recording apparatus and a recording power control method that are adapted to the high-speed recording and can set an optimal erasing power with a high accuracy through the introduction of a novel evaluation method.

An optical disc recording apparatus according to the invention includes: a light power controller which supplies a test writing signal of a predetermined mark length or space length with the laser power varied, to an optical head; a test writing signal detector which detects the number of error mark signals having a mark length or space length that is different from the mark length or space length of the test writing signal, from the detection signal of the optical head; and a controller which sets an optimal value of the recording power or erasing power, based on the laser power value of the time when the number of error mark signals detected by the test writing signal detector is a predetermined number.

Further, an optical disc recording apparatus according to the invention includes: a light power controller which supplies, to an optical head, a test writing signal of a predetermined mark length or space length with varied laser power; a test writing signal detector which detects an amplitude value of an envelope of the test writing signal from the detection signal of the optical head; and a controller which sets an optimal value of erasing power based on a laser power value of the time when the amplitude value detected by the test writing signal detector is a predetermined level.

Further, in the optical disc recording apparatus according to the invention, the test writing signal detector detects the number of error mark signals and an amplitude value of an envelope from the test writing signal, where the controller obtains a first threshold of the erasing power based on the number of error mark signals, obtains a second threshold of the erasing power based on an amplitude value, and sets an optimal value of the erasing power from an average value of the first and second thresholds.

A recording power control method according to the invention includes the steps of: recording, to an optical disc, a test writing signal of a predetermined mark length or space length with varied laser power; detecting the number of error mark signals having a mark length or space length that is different from the mark length or space length of the test writing signal from reflection of a laser beam irradiated onto the optical disc; obtaining a laser power value of the time when the number of the detected error mark signals is a predetermined number; and setting an optimal value of erasing power based on the laser power value.

Further, a recording power control method according to the invention includes the steps of: recording, to an optical disc, a test writing signal of a predetermined mark length or space length with varied laser power; detecting an amplitude value of an envelope of the test writing signal from reflection of a laser beam irradiated onto the optical disc; obtaining a laser power value of the time when the detected amplitude value is a predetermined level; and setting an optimal value of erasing power based on the laser power value.

The recording power control method according to the invention further includes the steps of: obtaining a first threshold of erasing power based on the number of error mark signals in a region where laser power is low; obtaining a second threshold of the erasing power based on the amplitude value in a region where laser power is high; and setting an optimal value of the erasing power from an average value of the first and second thresholds.

According to the invention it is possible to set the erasing power with high accuracy and realize stability in recording.

DETAILED DESCRIPTION OF THE PREFERRED EMBODIMENT

Figure 1:
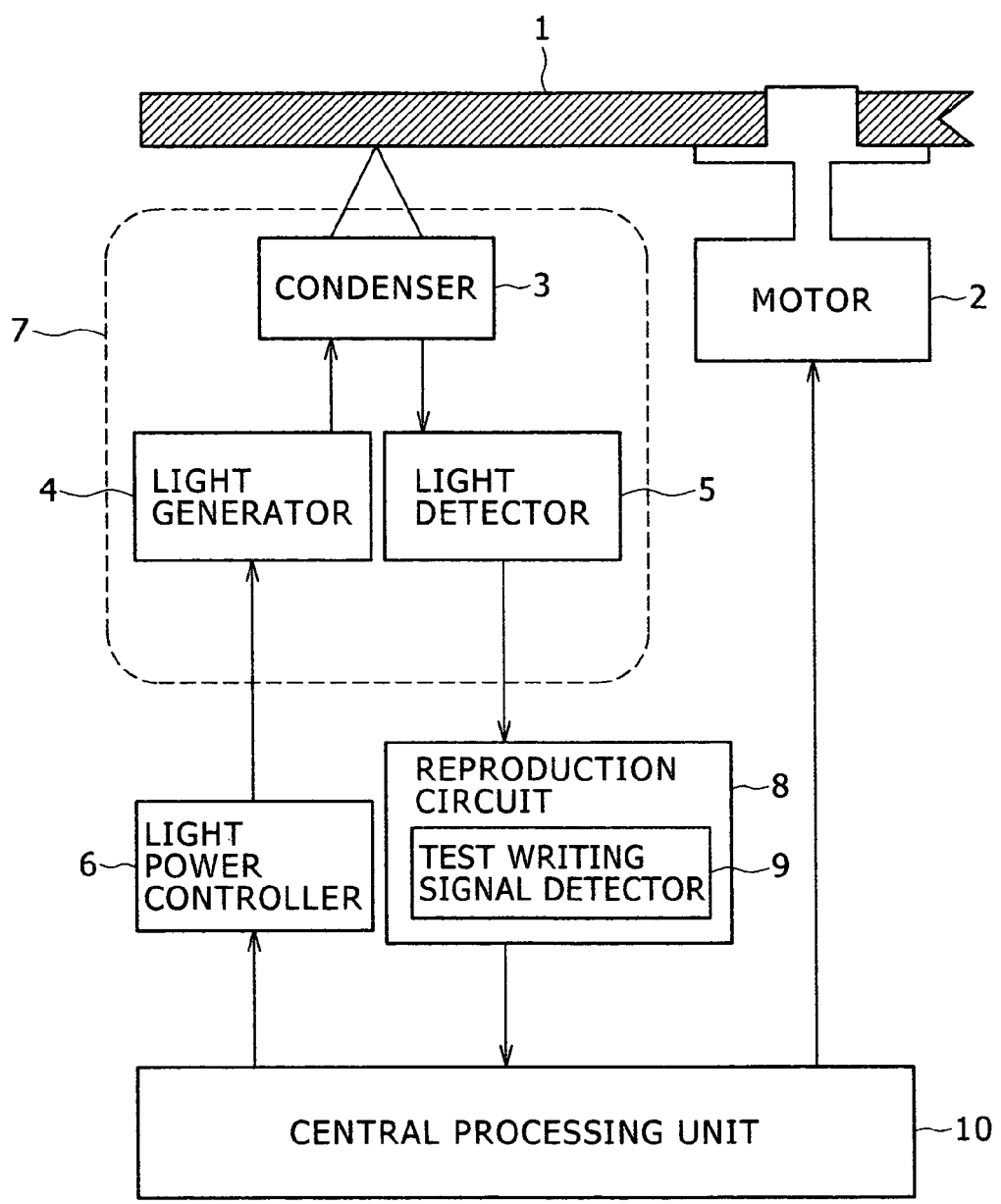
FIG. 1 is a block diagram showing an example of an optical disc recording apparatus according to the present invention.

FIG. 1 is a block diagram showing an embodiment of an optical disc recording apparatus according to the present invention. A rewritable phase-change type optical disc 1 is rotated by a motor 2. A light power controller (laser driver) 6 controls a light generator (semiconductor laser) 4 so as to generate a laser beam with a light power (laser power) directed by a central processing unit (CPU) 10. The laser beam is condensed by a condenser (including a condenser lens, an objective lens) 3 and thus a light spot is formed on the optical disc 1. A light detector (photodiode) 5 detects using a reflection from the light spot. The light detector 5 includes plural divided light detectors. The condenser 3, the light generator 4 and the light detector 5 are mounted in an optical head 7.

A reproduction circuit 8 reproduces information recorded on the optical disc, using a reproduction signal from the light detector 5. The reproduction circuit 8 includes a test writing signal detector 9. Further, the central processing unit 10 has a function of recording a test writing pattern with the recording power varied in the test writing, and has a function of taking a result detected in the test writing signal detector 9 to define the optimal power.

Figure 2:
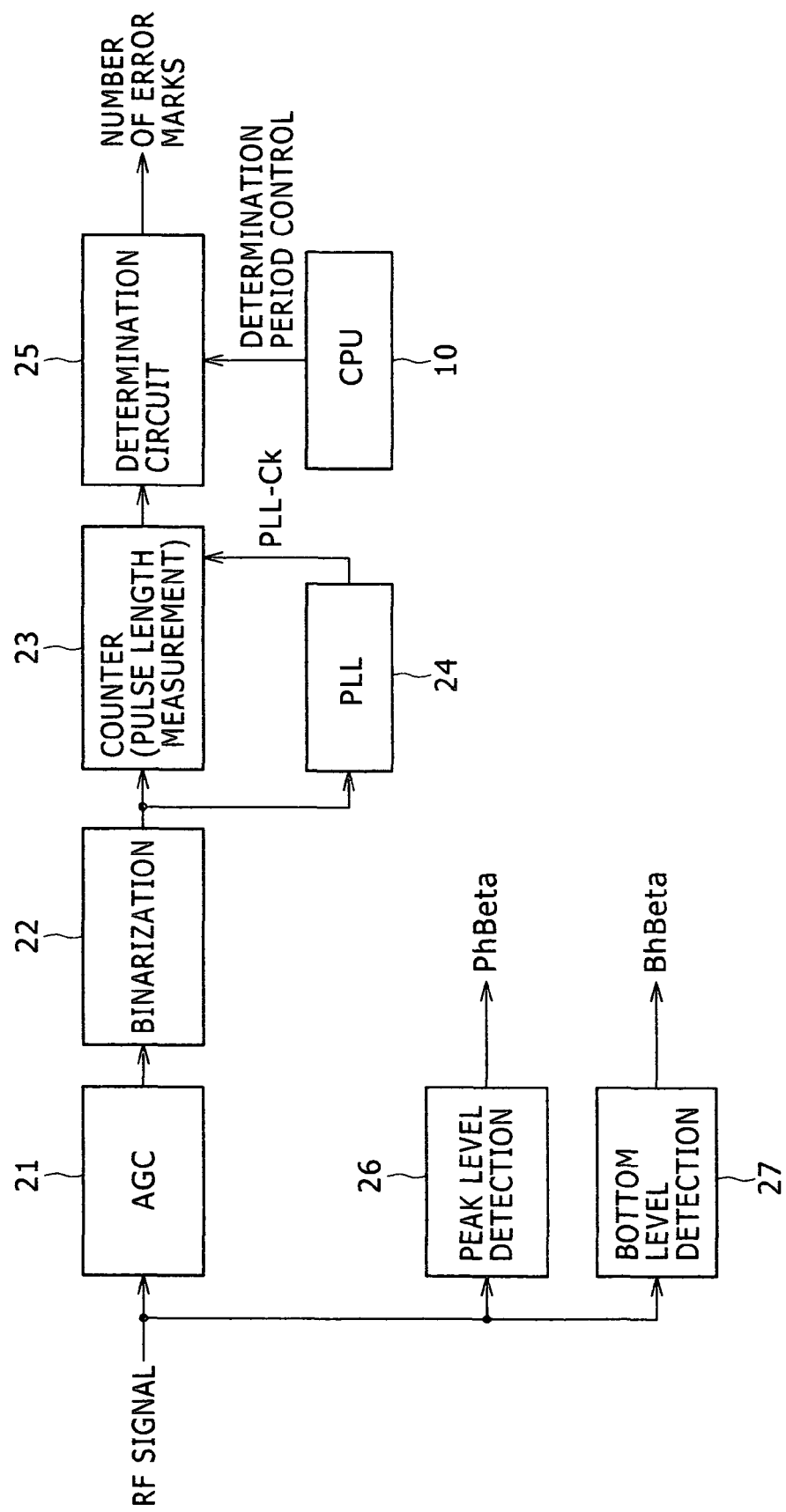
FIG. 2 is a diagram showing the internal configuration of a test writing signal detector 9 in an embodiment of the invention.

FIG. 2 is a diagram showing the internal configuration of the test writing signal detector 9 in FIG. 1. This detector has an error mark detection function for inputting a reproduction signal (RF signal) of the test writing signal to obtain the number of pulses with a mark length (or space length) other than the mark length (or space length) that has been used for the test writing, and has an envelope detection function for detecting the envelope (the peak level and bottom level) from the RF signal.

The former error mark detection function adjusts the amplitude of the input RF signal in an AGC circuit 21 to form a rectangular pulse in a binarization circuit 22. A counter circuit 23 counts a pulse length (mark length or space length) of each input pulse with a reference clock from a PLL circuit 24 to obtain its pulse length. A determination circuit 25 determines whether the pulse length of each pulse is identical to the pulse length of the test writing signal, and counts and outputs the number of pulses (the number of error marks) that are not identical within a determination period specified by the CPU 10.

The latter envelope detection function, in relation to the input RF signal, is to detect and output a peak level (PhBeta) in a peak level detection circuit 26 as well as a bottom level (BhBeta) in a bottom level detection circuit 27.

Next, an optimal setting method of the erasing power in the embodiment will be described. In this embodiment, power thresholds are obtained respectively in a low power region and a high power region to set an optimal value as the intermediate value. Here, the low power region and the high power region are defined in the following way.

With a power Pw for forming a recording mark and a power Pe for forming a space, it is defined that the low power region is on the low power side and the high power region is on the high power side, from the boundary of the Pe value which is a standard power recorded in the control data that has been recorded in the optical disc, or from the boundary of the Pe value obtained in a first test writing which is performed before a second test writing (this embodiment) for obtaining the erasing power. Incidentally, the Pe value of the first test writing, described in paragraphs [0019] to [0022] of Japanese Patent Application Laid-Open No. Hei 10(1998)-320777, means the erasing power Pe value obtained in such a way that the values of Pw and Pe, corresponding to a jitter of 13%, are calculated by changing the Pw and Pe from the low power to the high power at a constant ratio and that the values are multiplied by a predetermined coefficient (based on the value described in the control data).

(1) Measurement in the Low Power Region

In the low power region, a threshold Pe0 is obtained by the above described error mark detection function. A specific pattern signal for test writing is overwritten and recorded on the optical disc on which the signal has been recorded (if not recorded, a predetermined base signal is recorded) in advance with the power varied. Then the ratio of the previously recorded signal remaining within the reproduced RF signal (the ratio of the number of error marks) is measured. The power where the ratio of the number of error marks is a predetermined value is defined as the threshold Pe0 on the low level side. In this case, for example, a 6T/7T signal with the mark length formed by combination of 6T and 7T (where T is a clock frequency) is suitable for the specific pattern, but other patterns may be applicable as well. Further, the ratio of the number of error marks for defining the power threshold Pe0 is conditioned so that the number of error marks is reduced for example to half (50%), but other ratios may be applicable as well.

Figure 3:
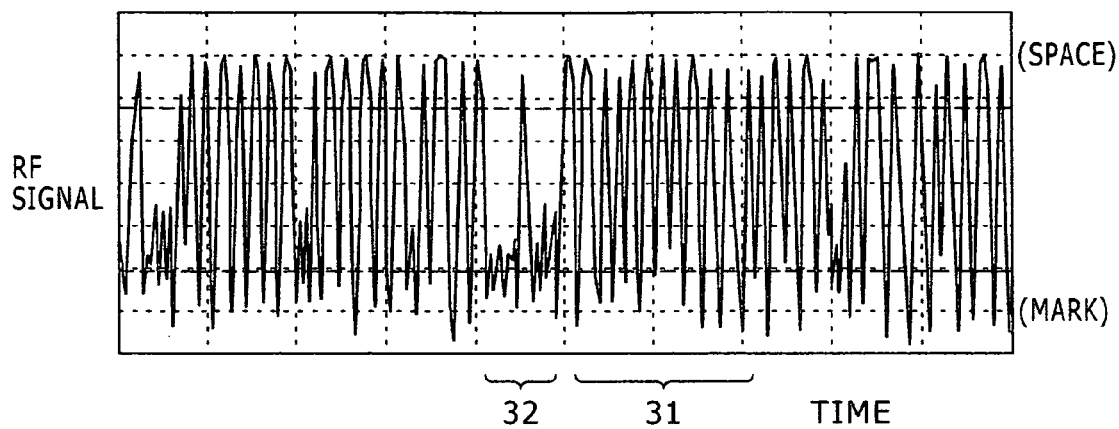
FIG. 3 is an example of an RF signal to be reproduced at the time of error mark detection in an embodiment of the invention.

FIG. 3 is an example of the RF signal to be reproduced in the error mark detection. The signal includes a part (reference symbol 31) of the 6T/7T signal identical to the mark length of the test writing pattern and a part (reference symbol 32) of the other mark length. The part other than the 6T/7T signal appears as small amplitude due to the incomplete erasure that occurs mainly from a lack of erasing power. The part other than the 6T/7T signal is counted as the error mark.

With the method it is possible to solve a problem arising in the conventional jitter detection method (error pulse). That is, in the jitter detection method, there has been a possibility that the lack of the edge number due to displacement of the slice level, the reduction of the error pulse sensitivity due to amplitude reduction, and the occurrence of garbled mark due to poor overwrite performance are incorrectly determined as normal. With this embodiment, the incorrect determination is avoided in relation to the part where erase failure occurs, even if the amplitude is varied, and the reliability is improved.

(2) Measurement in the High Power Region

In the high power region, a threshold Pe1 is obtained by the above described envelope detection function. Similarly to the description above, the specific pattern signal for test writing is overwritten and recorded with the power varied. In this way the peak level and bottom level are detected in relation to the reproduced RF signal.

Figure 4:
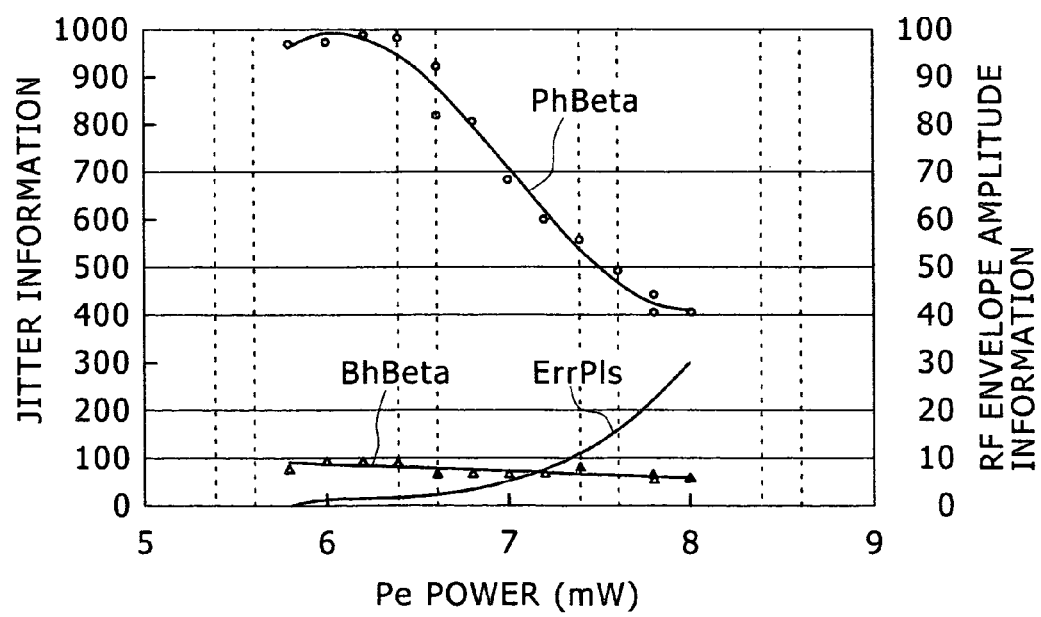
FIG. 4 is an example of measured behaviors of the peak level and bottom level relative to the change of an erasing power Pe.

FIG. 4 is an example of measured behaviors of the peak level (PhBeta) and the bottom level (BhBeta) relative to the change in the erasing power Pe. The peak level corresponds to a space signal and the bottom level corresponds to a mark signal. The bottom level hardly varies when the power is increased, but the peak level starts to decrease when the power is beyond a certain power level. This level decrease is caused by the phenomenon of DC recording performed in the space region due to excessive erasing power. In this embodiment, assuming that the point where the peak level decreases, for example, to 95% based on the bottom level is an amplitude change point as a point from which the level decrease starts, thus the power of this time is obtained as the threshold Pe1.

FIG. 4 also shows for comparison the change of an error pulse (ErrPls) evaluated by the conventional jitter method. It is found that the envelope detection method according to the embodiment is effective as the position where the error pulse increases and the position where the peak level (PhBeta) in the embodiment decreases well correspond to each other.

In this embodiment, an envelope signal of the RF signal is detected, where the peak level represents the space level and the bottom level represents the mark level. The point where the peak level decreases by a predetermined amount based on the mark level as a reference level (zero level), is set to the threshold on the high power side. In other words, the embodiment is to take the change of the amplitude value of the RF signal as peak-level to bottom-level.

The envelope detection method used in the embodiment is to evaluate the erase performance from the decrease of the amplitude value of the reproduced RF signal. Thus the method has an excellent response characteristic in the high-speed recording compared to the conventional jitter detection method, and can evaluate with a simple circuit in a stable and accurate manner.

Figure 5:
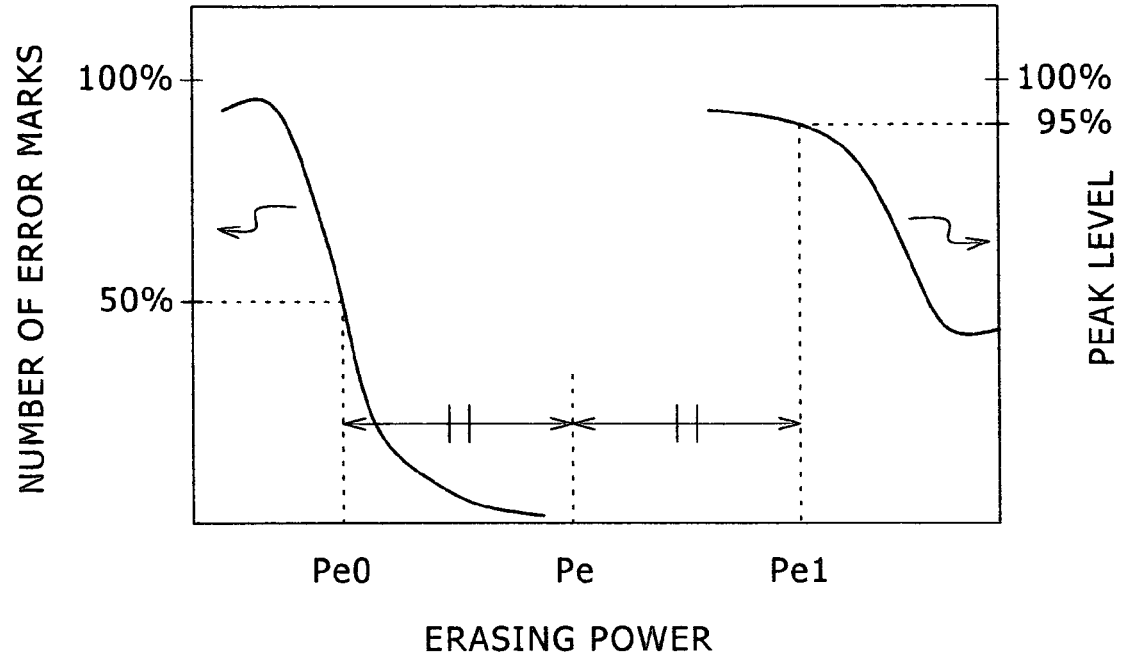
FIG. 5 is a diagram illustrating a setting method of an optimal erasing power in an embodiment of the invention.

FIG. 5 is a diagram illustrating a method of setting an optimal erasing power based on the measurement result of the above described (1) and (2). Here, the average value of the two thresholds Pe0 and Pe1 of the erasing power is set as the optimal power Pe of the erasing power. At this time, a weighted average may be applicable instead of a simple average value.

Although the above description has been made assuming that the error mark method is used for the definition of the threshold in the low power region, the error mark detection method can be used in all regions including the high power region as well. In other words, the recorded mark length extends beyond the size of the test writing pattern (6T, 7T) when the power is excessive, and the number to be counted as the error mark increases. However, in this case, the increase start point tends to displace towards the side where the power is larger than at the increase start point obtained by the conventional jitter method. Thus it is necessary to correct the displacement. Further, it is desirable to adopt the method taking into account the medium characteristics as the phenomenon of degradation of the disc medium (degradation of resistance to repeated overwriting) due to the excessive power is observed.

Figure 6:
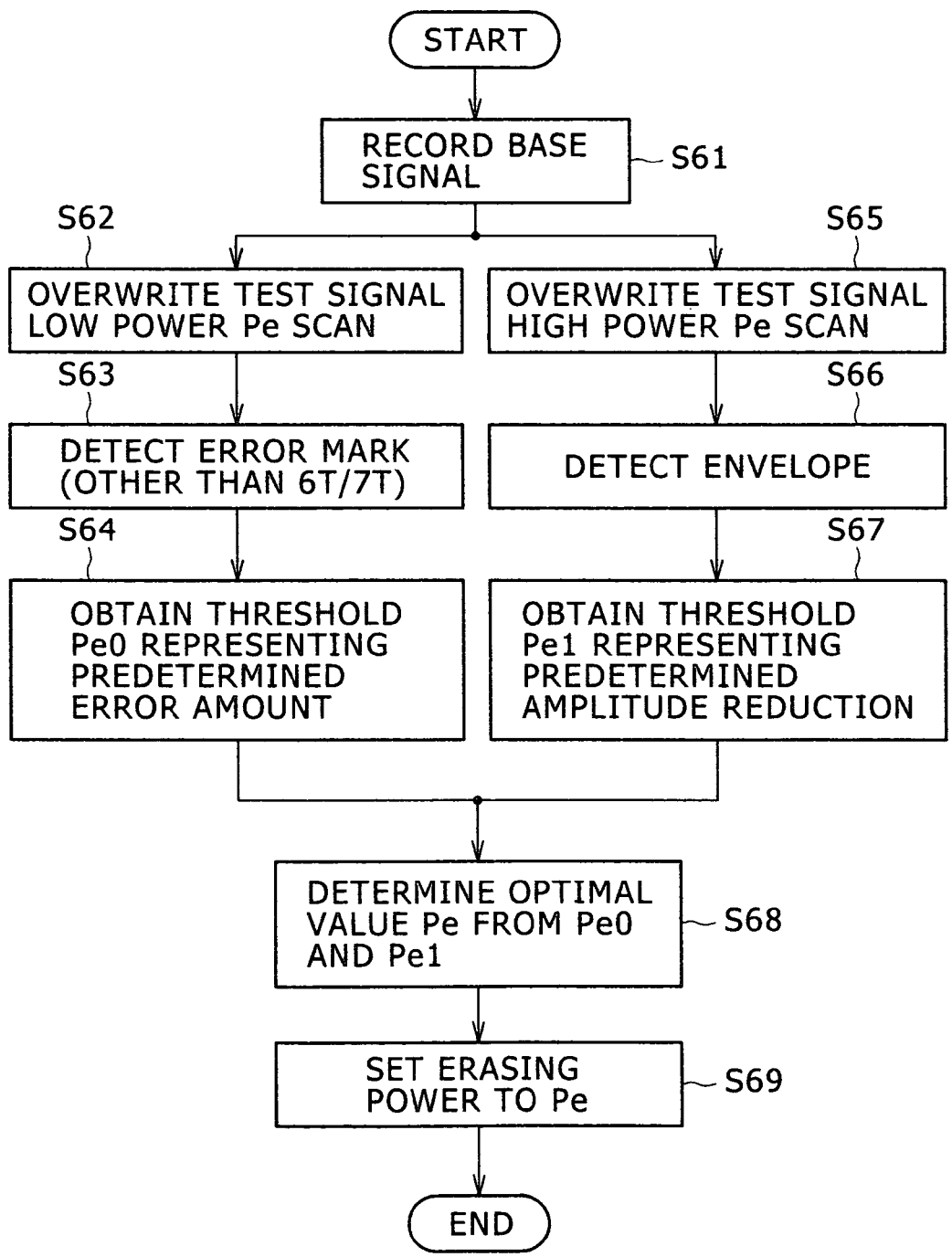
FIG. 6 is a flowchart showing an example of the erasing power setting method in an embodiment of the invention.

FIG. 6 is a flowchart showing an example of the erasing power setting method in the embodiment. When the instruction for the erasing power setting is received, a test signal to be the base signal is recorded on the optical disc (S61). This process can be omitted when using the optical disc on which the signal has already been recorded. The base signal desirably has a pattern different from the pattern of the signal which will be test written later in order to avoid interference therebetween. The power levels (the power Pw for forming the recording mark, the power Pe for forming the space) at this time are set in accordance with the standard specifications stored in each optical disc. The power levels may also be set to the power values Pw, Pe obtained in such a way that Pw and Pe are changed with the Pw/Pe ratio kept constant and the power where the jitter amount corresponds to, for example, 3% is multiplied by a predetermined coefficient.

Next, as an erase signal, a test signal of a specific pattern (for example 6T/7T mark) is overwritten and recorded on each sector with the power varied gradually. At this time, the overwrite operation is performed in two systems, a scan in the low power region (S62) and a scan in the high power region (S65). The processes of the systems may be either parallel processes (time-sharing processes) or serial processes in terms of time.

For the signal recorded in the low power region, the error mark signal other than the predetermined mark length (6T/7T) is detected and counted in RAW (Read After Write) after recording (S63). At the time when the number of error mark signals within a predetermined period decreases to a predetermined ratio (for example 50%), the power value Pe0 of this time is obtained (S64).

On the other hand, for the signal recorded in the high power region, the envelope amplitude (the peak level and bottom level) is detected in the RAW after recording (S66). At this time, an averaging procedure and a defect correction procedure are applied to each of the detected data according to the necessity. Then, at the time when the peak level decreases to a predetermined amplitude (for example 95%), the power value Pe1 of this time is obtained based on the difference between the peak level and the bottom level (S67).

The two power values Pe0 and Pe1 obtained as described above are averaged, and the obtained value Pe is then defined as the optimal erasing power (S68). As a matter of course, the both values may be weight-averaged by multiplying a predetermined ratio in the average calculation. The erasing power is set to the defined optimal power value Pe (S69).

In the above description, the error mark signal is used for the erasing power adjustment. However, the present invention is also applicable to the case of adjusting the recording power using the error mark signal. In the case where the recording power is low, similarly to the case where the erasing power is low, the mark cannot be normally formed where the mark length and space length do not have a desired width. Here using the error mark signal, the recording power of this time is multiplied by a coefficient α with the threshold where a desired mark length can be obtained set, for example, to 50% to obtain the optimal power for recording. In this way the recording power is adjusted to the optimal power. Also, this method may be used for setting a power to record the above described base signal.

The recording and erasing power setting methods according to the embodiment, particularly in the CAV high-speed recording of the phase change optical disc, prevent the jitter increase that causes a problem when performing overwriting at a wide range of recording speeds, and realize stability of the high-speed recording performance of a DVD-RAM disc and the like.

What is claimed is:

1. An optical disc recording apparatus for recording a signal on an optical disc, the apparatus comprising:
   an optical head which records a signal by irradiating a laser beam onto a rotating optical disc to detect reflection of the laser beam;
   a light power controller which supplies, to the optical head, a test writing signal of a predetermined mark length or space length with varied laser power;
   a test writing signal detector which detects the number of error mark signals having a mark length or space length that is different from the predetermined mark length or space length of the test writing signal, from a detection signal of the optical head; and a controller which sets an optimal value of recording power based on the laser power value of the time when the number of error mark signals detected by the test writing signal detector is a predetermined amount, wherein:

the test writing signal detector further detects an amplitude value of an envelope of the test writing signal from a detection signal of the optical head, and the controller obtains a first threshold of the erasing power based on the number of error mark signals detected by the test writing signal detector in a region where the laser power is low, obtains a second threshold of the erasing power based on an amplitude value detected by the test writing signal detector in a region where the laser power is high, sets an optimal value of the erasing power from an average value of the first and second thresholds, and sets an optimal value of erasing power using the optimal value of the recording power.

2. A recording power control method for recording a signal on an optical disc, the method comprising steps of:

recording, to the optical disc, a test writing signal of a predetermined mark length or space length with varied laser power;

irradiating a laser beam onto the optical disc to detect the number of error mark signals having a mark length or space length that is different from the predetermined mark length or space length of the test writing signal, from reflection of the laser beam;

obtaining a laser power value of the time when the detected number of error mark signals is a predetermined amount;

setting an optimal value of erasing power based on the laser power value;

detecting an amplitude value of an envelope of the test writing signal from reflection from the optical disc;

obtaining a laser power value of the time when the detected amplitude value is a predetermined level;

obtaining a first threshold of erasing power based on the number of error mark signals in a region where laser power is low;

obtaining a second threshold of the erasing power based on the detected amplitude value in a region where laser power is high; and setting an optimal value of the erasing power from an average value of the first and second thresholds.

3. An optical disc recording apparatus for recording a signal on an optical disc, the apparatus comprising:

an optical head which records a signal by irradiating a laser beam onto a rotating optical disc to detect reflection of the laser beam;

a light power controller which supplies, to the optical head, a test writing signal of a predetermined mark length or space length with varied laser power;

a test writing signal detector which detects the number of error mark signals having a mark length or space length that is different from the predetermined mark length or space length of the test writing signal, from a detection signal of the optical head and detects an amplitude value of an envelope of the test writing signal from a detection signal of the optical head; and a controller which sets an optimal value of recording power, wherein the controller obtains a first threshold of the erasing power based on the number of error mark signals detected by the test writing signal detector in a region where the laser power is low, obtains a second threshold of the erasing power based on the amplitude value detected by the test writing signal detector in a region where the laser power is high, and sets the optimal value of the erasing power based on the first and second thresholds.

4. A recording power control method for recording a signal on an optical disc, the method comprising steps of:

recording, to the optical disc, a test writing signal of a predetermined mark length or space length with varied laser power;

irradiating a laser beam onto the optical disc to detect the number of error mark signals having a mark length or space length that is different from the predetermined mark length or space length of the test writing signal, from reflection of the laser beam;

obtaining a laser power value of the time when the detected number of error mark signals is a predetermined amount;

irradiating a laser beam onto the optical disc to detect an amplitude value of an envelope of the test writing signal, from reflection of the laser beam;

obtaining a laser power value of the time when the detected amplitude value is a predetermined level;

obtaining a first threshold of erasing power based on the number of error mark signals in a region where laser power is low;

obtaining a second threshold of the erasing power based on the detected amplitude value in a region where laser power is high; and setting an optimal value of the erasing power based on the first and second thresholds.

* * * * *